US009340309B2

(12) United States Patent
Nakagawa et al.

(10) Patent No.: US 9,340,309 B2
(45) Date of Patent: May 17, 2016

(54) SUPPLY APPARATUS FOR SPOUT-EQUIPPED BAGS

(71) Applicant: TOYO JIDOKI CO., LTD., Tokyo (JP)

(72) Inventors: Koichi Nakagawa, Yamaguchi-ken (JP); Yoshikatsu Nakahara, Yamaguchi-ken (JP); Kazunori Yamamoto, Yamaguchi-ken (JP)

(73) Assignee: Toyo Jidoki Co., Ltd. (JP)

( * ) Notice: Subject to any disclaimer, the term of this patent is extended or adjusted under 35 U.S.C. 154(b) by 0 days.

(21) Appl. No.: 14/799,277

(22) Filed: Jul. 14, 2015

(65) Prior Publication Data

US 2016/0059978 A1    Mar. 3, 2016

(30) Foreign Application Priority Data

Aug. 26, 2014   (JP) ................................. 2014-171271

(51) Int. Cl.
   *B65B 35/24*    (2006.01)
   *B65B 43/42*    (2006.01)
   (Continued)

(52) U.S. Cl.
   CPC .................. *B65B 43/48* (2013.01); *B65B 35/24* (2013.01); *B65B 35/405* (2013.01); *B65B 43/42* (2013.01);
   (Continued)

(58) Field of Classification Search
   CPC ........ B65B 35/24; B65B 43/48; B65B 43/42; B65B 43/465; B65B 43/52; B65B 3/045; B65B 21/08; B65B 38/20; B65B 35/40; B65B 35/405; B65B 43/44; B65G 17/002; B65G 47/68; B65G 2201/0238
   USPC ................ 198/433, 485.1, 681, 465.3, 465.4, 198/466.1
   See application file for complete search history.

(56) References Cited

U.S. PATENT DOCUMENTS

| 5,553,698 A * | 9/1996 | Patois ................... B65G 15/14 198/626.1 |
| 6,338,371 B1 * | 1/2002 | Araki ..................... B65B 43/50 141/129 |

(Continued)

FOREIGN PATENT DOCUMENTS

| JP | 2500557 | 7/1993 |
| JP | 4584440 | 5/2002 |

OTHER PUBLICATIONS

English language translation of claims and abstract of JP 2500557.
English language translation of claims and abstract of JP 4584440.
U.S. Appl. No. 14/799,234, filed Jul. 14, 2015 and entitled "Supply Apparatus for Spout-Equipped Bags."

*Primary Examiner* — Mark A Deuble
(74) *Attorney, Agent, or Firm* — Merek, Blackmon & Voorhees, LLC

(57) ABSTRACT

To exhaust a holding rail that has been emptied by a simple mechanism after pushing a plurality of spout-equipped bags from the holding rail to a transfer rail.
An elongated-shape holding rail 14 aligning and holding many spout-equipped bags W in a straight line is moved to transfer positions c1 to c4 by a rail supply part 80. The conveyed holding rail 14 is held by a retention mechanism 3 in a state of being opposite to a transfer rail 60. A pushing member 52 reciprocates in a longitudinal direction of the holding rail 14 by having a bag conveying face 52*b*3, which contacts on the spout-equipped bag hung from the holding rail 14 and pushes the spout-equipped bag toward the transfer rail 60, and a rail pushing face 52*b*2, which contacts on the holding rail 14 and exhausts opposite the transfer rail 60. A lift mechanism is provided to move the pushing member 52 downward when the pushing member 52 moves forward, and to move the pushing member 52 upward to the height where the rail pushing face 52*b*2 interferes to the holding rail 14 when the pushing member 52 moves backward.

7 Claims, 14 Drawing Sheets

(51) Int. Cl.
*B65B 43/48* (2006.01)
*B65G 37/00* (2006.01)
*B65B 35/40* (2006.01)
*B65B 43/46* (2006.01)
*B65B 43/52* (2006.01)
*B65B 3/04* (2006.01)

(52) U.S. Cl.
CPC ............... *B65B 43/465* (2013.01); *B65B 43/52* (2013.01); *B65G 37/00* (2013.01); *B65B 3/045* (2013.01); *B65G 2201/0247* (2013.01)

(56) References Cited

U.S. PATENT DOCUMENTS

| | | | |
|---|---|---|---|
| 6,575,289 B2 * | 6/2003 | Hiramoto | B65B 43/465 198/433 |
| 2010/0170591 A1 * | 7/2010 | Murray | B65B 43/42 141/1 |
| 2010/0206424 A1 * | 8/2010 | Gustafsson | B65B 43/465 141/1 |
| 2011/0017343 A1 * | 1/2011 | Murray | B08B 9/00 141/1 |

* cited by examiner

SUPPLY APPARATUS FOR SPOUT-EQUIPPED BAGS

BACKGROUND OF THE INVENTION

1. Technical Field

The present invention relates to an apparatus for supplying spout-equipped bags, which supplies spout-equipped bags to a packing machine.

2. Prior Art

Spout-equipped bags are delivered from a bag manufacture to a factory in a state where spout portions are aligned in a line on a plastic holding rail (or rail-formed magazine). To adjust a mismatch between a speed for treating the spout-equipped bags on the packing machine and a speed that an operator loads the spout-equipped bags delivered from the bag manufacture, a supply apparatus that supplies the spout-equipped bags to the packing machine by once storing them is used in the factory. Apparatuses disclosed in Japanese Patent No. 2500557 and Japanese Patent No. 4584440 are known as the above-mentioned supply apparatus.

The supply apparatus disclosed in Japanese Patent No. 2500557 is so constructed that a holding rail for holding nozzle-equipped pouches is pushed and moved by a chain conveyer in a state of being loaded on a guide, the holding rail is moved to a pouch pushing-out position by attachments of a relay conveyor and positioned by a positioning stopper, and thereafter, a plurality of nozzle-equipped punches held on the holding rail are pushed out. Then, the positioning stopper is released, and the holding rail that has been emptied is exhausted in a conveying direction by operating the relay conveyor. In the supply apparatus disclosed in Japanese Patent No. 2500557, the operator does not need to transfer the spout-equipped bags housed on the holding rail and should only mount the holding rail on the guide in a state of being delivered from the bag manufacture.

Japanese Patent No. 4584440 discloses a supply apparatus for a multi-processing machine that processes the spout-equipped bags in parallel. In the multi-processing machine, a plurality of spout-equipped bags must be supplied in parallel. Therefore, in the supply apparatus in Japanese Patent No. 4584440, the plurality of spout-equipped bags are stored on a plurality of conveyor rails on an endless chain which is circulated and moved on an endless track, and when the spout-equipped bags are conveyed to a taking-out or removal position, they are simultaneously pushed and moved from two conveying rails to two transfer rails by pushing members on the position.

In storing a large quantity of spout-equipped bags on the supply apparatus, the operator can transfer the spout-equipped bags housed on the plastic holding rails to the conveying rails in an asynchronous manner to filling process of the packing machine.

The supply apparatus in Japanese Patent No. 2500557 exhausts the holding rail that has been emptied at the pouch pushing-out position in the conveying direction, and therefore, a large interval between the packing machine and a place where the exhausted empty holding rail is retained. Since the plurality of conveying rails are circulated and moved on the endless track in the supply apparatus in Japanese Patent No. 4584440, it is necessary to transfer the spout-equipped bags housed on the plastic holding rail to the conveying rails them from the bag manufacture to the factory.

The contents of Japanese Patent No. 2500557 and Japanese Patent No. 4584440 are incorporated herein by reference in their entirely.

SUMMARY OF THE INVENTION

In the present invention, a spout-equipped bag or a nozzle-equipped pouch is called "a spout-equipped bag" below. It is an object of the present invention to provide a supply apparatus for exhausting a holding rail that has been emptied through a simple mechanism after pushing a plurality of spout-equipped bags from the holding rail into a transfer rail.

The above object is accomplished by a unique structure of the present invention for a supply apparatus for spout-equipped bags for supplying spout-equipped bags on a transfer position to a packing machine which applies a predetermined packing to the spout-equipped bags through a transfer rail. The supply apparatus includes a holding rail, a rail supply part, a retention mechanism, a pushing member and a lift mechanism. The holding rail has an engaging part being engaged on a flange portion of a spout-equipped bag, and holds a plurality of spout-equipped bags lined up in a row as the spot-equipped bags are hung. The rail supply part conveys the holding rail to the transfer position in order to transfer the spout-equipped bags on the transfer rail. The retention mechanism retains the holding rail conveyed from the rail supply part on the transfer position in a state of opposing to the transfer rail. The pushing member reciprocates in a longitudinal direction of the holding rail by having a bag conveying face which contacts on the spout-equipped bag hung from the holding rail and pushes it toward the transfer rail, and a rail pushing face which contacts on the holding rail and exhausts it from the transfer position opposite the transfer rail. The lift mechanism moves the pushing member downward when the pushing member moves forward, and moves the pushing member upward to the height where the rail pushing face interferes to the holding rail when the pushing member moves backward.

According to the supply apparatus of the present invention, since the holding rail that has been emptied is exhausted opposite the transfer rail, there is an effect of being able to increase the interval between the packing machine and the place where the holding rail is retained. Besides, since the operation for exhausting relies on the reciprocating motion due to the pushing member, there is an effect of being able to realize using a simple mechanism.

DETAILED DESCRIPTION OF THE INVENTION

A supply apparatus 100 for spout-equipped bags in the present invention will be described in detail with reference to figures.

Figure 1:
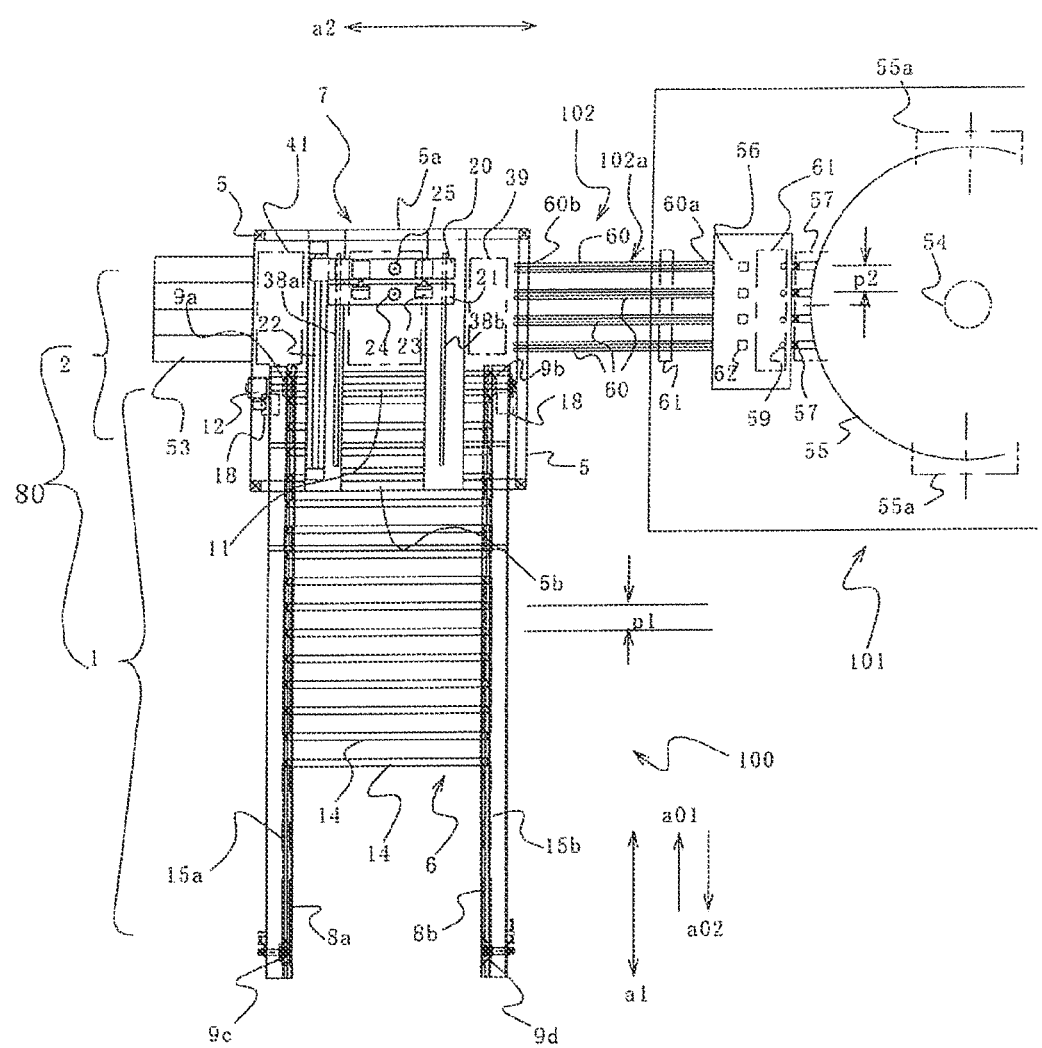
FIG. 1 is a plane view showing a supply apparatus and a packing machine.
Figure 2:
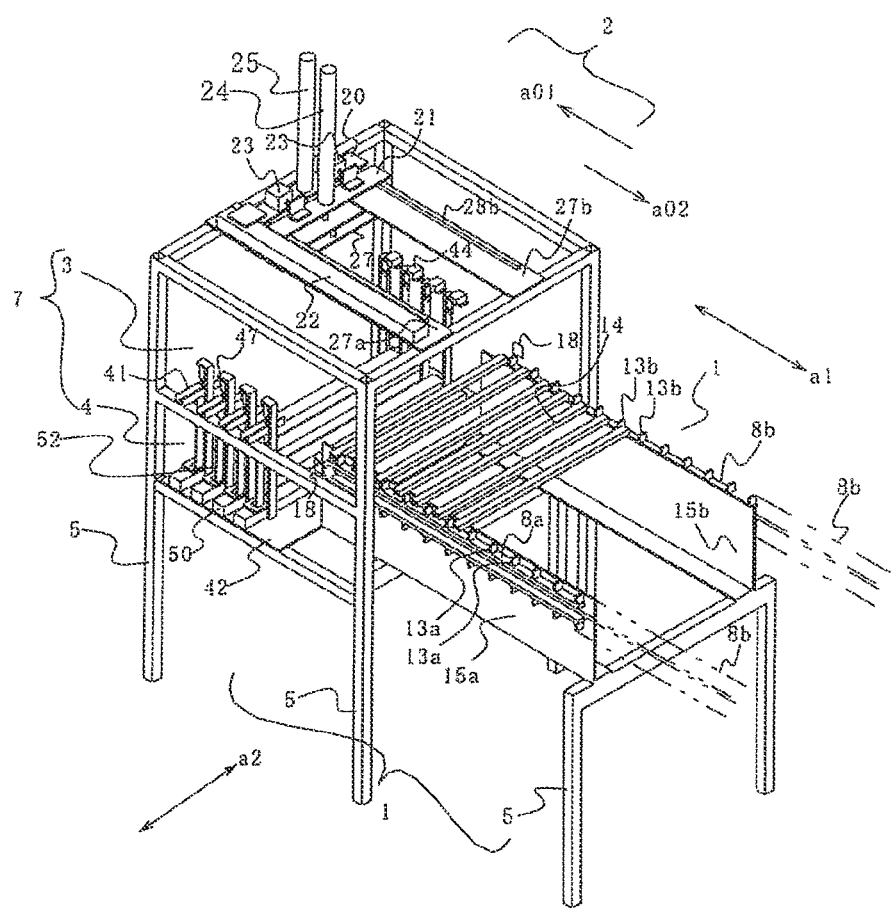
FIG. 2 is a schematic perspective view of a principal part of the supply apparatus.

In FIG. 1 and FIG. 2, the supply apparatus 100 includes a rail supply part 80 and a bag pushing device 7. For convenience of explanation, a reference mark a1 indicates a front-back direction, a reference mark a01 indicates front, a reference mark a02 indicates back, and a reference mark a2 indicates a left-right direction, respectively. The rail supply part 80 includes an intermittently conveying part 1 and an interval change conveying part 2.

The intermittently conveying part 1 has holding rails 14 loaded by an operator and intermittently conveys the holding rails 14 at a fixed interval P1. The intermittently conveying part 1 includes endless chains 8a, 8b, projection pieces 13a, 13b, and support plates 15a, 15b.

A pair of right and left endless chains 8a, 8b are disposed on the right and left sides of the pedestal 5 in a front-back direction a1. The endless chains 8a, 8b have respectively front end parts wrapped around their corresponding driving sprockets 9a, 9b and back end parts wrapped around driven sprockets 9c, 9d mounted on the pedestal 5. The driving sprockets 9a, 9b are fixed on a driving shaft 11, and rotated by a driving motor 12 which is linked and connected to the driving shaft 11.

In FIG. 2, each of the endless chains 8a, 8b has a plurality of projection pieces 13a, 13b fixed on positions at fixed interval along its longitudinal direction, namely, at the interval P1 in the front-back direction a1. The interval P1 is based on an inch standard because standard chains are used for the endless chains 8a, 8b. An interval between the projection pieces 13a, 13b in a left-right direction a2 is set below the length of the holding rails.

The support plates 15a, 15b are provided along their insides of the right and left endless chains 8a, 8b. The support plates 15a, 15b respectively have upper edges supporting the holding rails 14 slidably and movably to the front a01 when the operator loads the holding rails 14 on the endless chains 8a, 8b. When the endless chains 8a, 8b move to the front a01, the projection pieces 13a, 13b push the holding rails 14. Then, when the holding rails 14 reach near the ends of the endless chains 8a, 8b, the holding rails 14 are intermittently aligned at the interval P1.

Figure 3A:
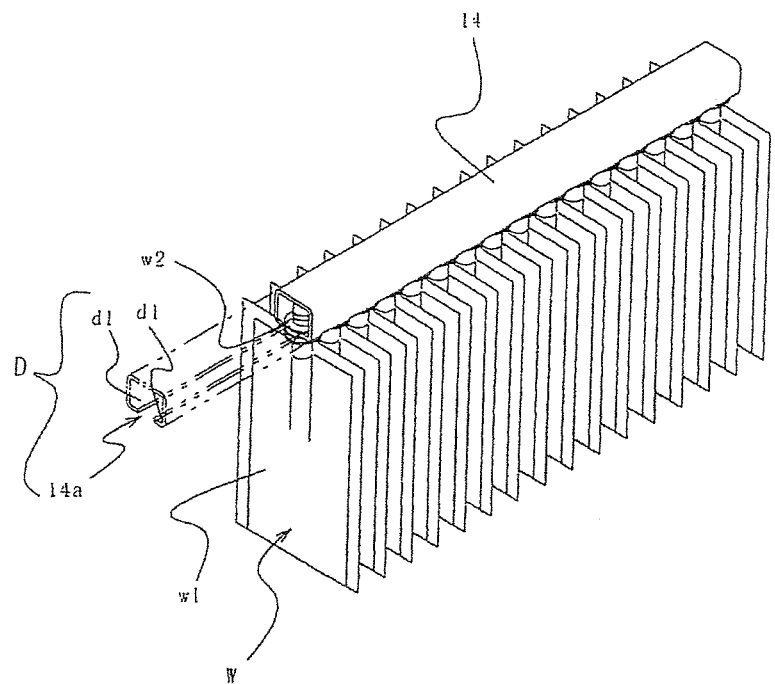
FIG. 3A is a perspective view of a holding rail conveyed by the supply apparatus and spout-equipped bags held on the holding rail.
Figure 3B:
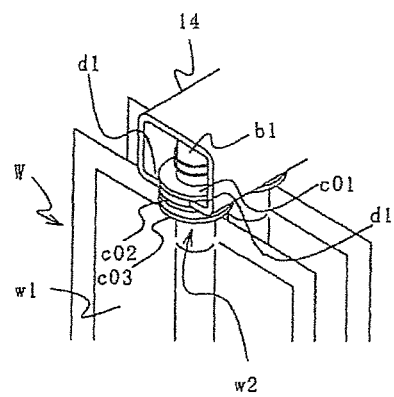
FIG. 3B is an enlarged view of a portion of FIG. 3A.

In FIG. 3, each spout-equipped bag W has a flexible bag portion w1 formed by resin film or aluminum film and a spout portion w2 connected to the top of the bag portion w1 in a state of protruding upwardly. The spout portion w2 has a cylindrical portion b1 at the center position and three flange portions c01, c02, c03 formed in parallel with the outer circumferential surface of the cylindrical portion b1.

Each holding rail 14 has a slit 14a formed on one outer circumferential plane of a linear square cylindrical member over the full longitudinal length. The holding rail 14 is, for example, integrally formed by synthetic resin material. An engage part D is formed by the slit 14a and the opposite edge portions d1, d1 of the slit 14a to engage with the flange portion c01 and the flange portion c02 of each spout-equipped bag W.

The engage portion D engages by inserting the cylindrical portion b1 into the slit 14a so as to position the opposite edge portions d1, d1 between the flange portion c01 and the flange portion c02. According to this, the spout-equipped bags W are held on the holding rails 14 in the state of being aligned in a row as a straight line and in a state of hanging. Not-illustrated caps are interfitted on the ends of the holding rails 14 detachably in order to prevent slip-out of the spout-equipped bags W. The spout-equipped bags W are delivered to a factory in a state of being housed in the holding rails 14 by bag makers.

Figure 4:
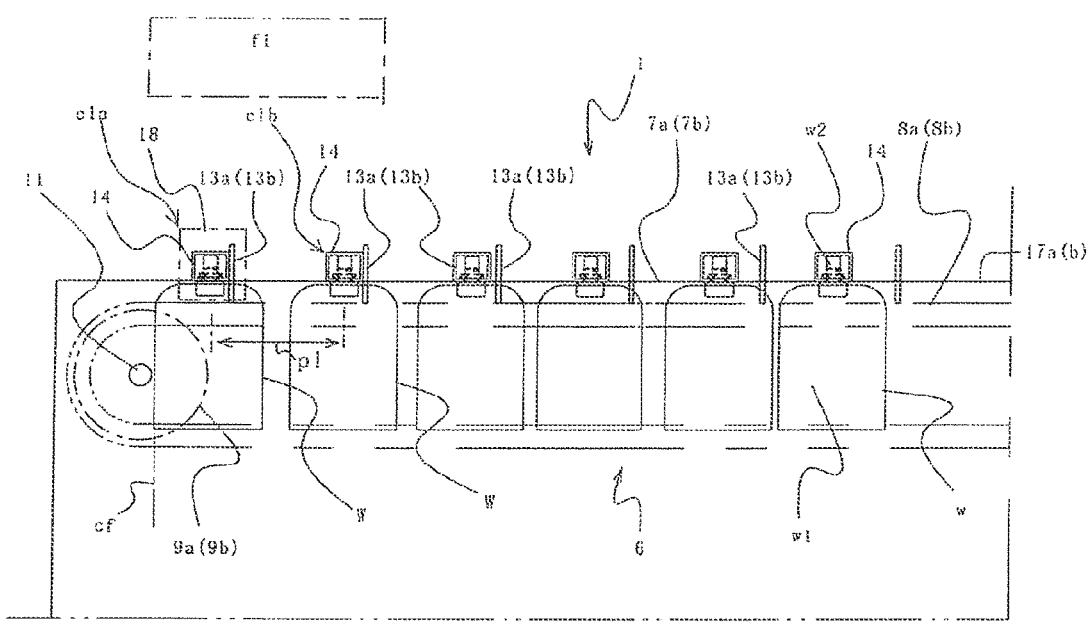
FIG. 4 is a schematic view of the side of a chain conveyer of the supply apparatus.
Figure 5:
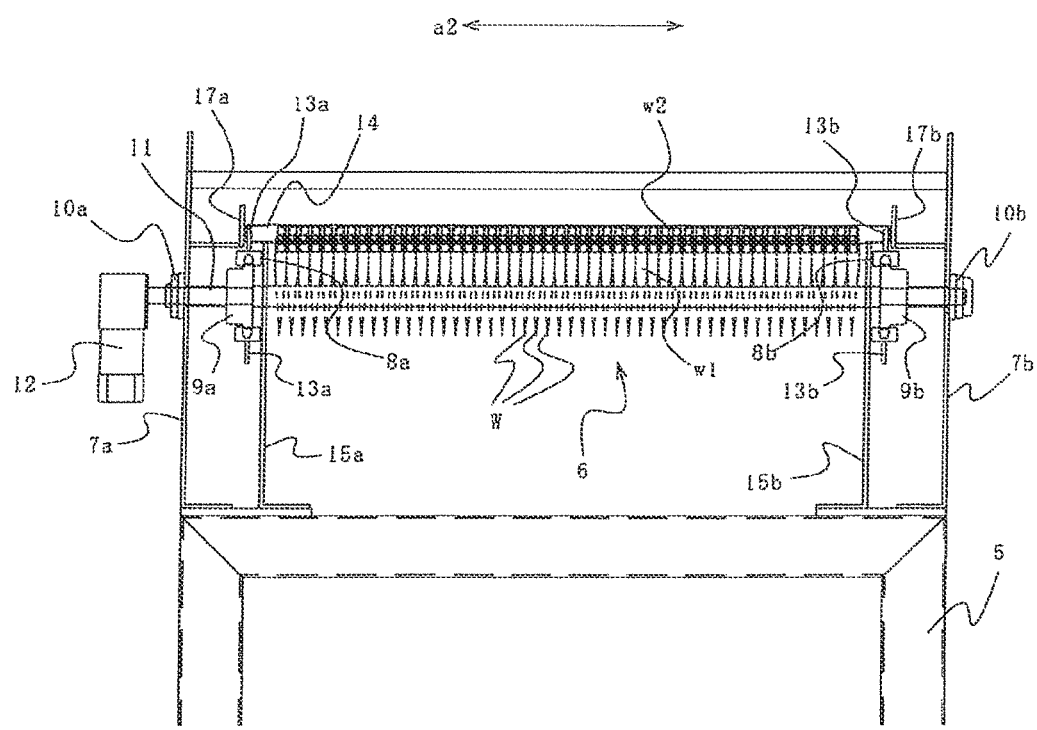
FIG. 5 shows the chain conveyer of the supply apparatus.

When supplying the holding rails 14 to the intermittently conveying part 1, as shown in FIG. 4, the holding rails 14 are mounted on the upper edges of the support plates 15a, 15b like a bridge in a state where their caps are removed by the operator. On the ends of the holding rails 14, line members 17a, 17b respectively having L-shaped sections (as shown in FIG. 5) are disposed along the front-back direction a1 to restrict a lateral displacement larger than the allowable limit of the holding rails 14. The line members 17a, 17b also prevent fall of the spout-equipped bags W.

In FIG. 4, thus supplied holding rails 14 housing the bags have their rear faces pushed by forward movement of the right and left projection pieces 13a, 13b so as to respectively slide and move to the front a01 on the upper edges of the support plates 15a, 15b. At least two or more holding rails 14 reaching the forefront of a conveyance range of the intermittently conveying part 1 are aligned to the front-back direction a1 at the interval P1, and respectively reach taking-out positions c1a, c1b right under a picking-up position f1.

In the intermittently conveying part 1, when one holding rail 14 reaches its conveyance terminal cf, a censor 18 installed near the conveyance terminal cf detects the holding rail 14 to generate a detection signal. While this signal is emitted, the operation of the driving motor 12 is stopped, and the movements of the right and left endless chains 8a, 8b are stopped. When the holding rail 14 positioned on the conveyance terminal cf is transferred to another location, feeding indication from the censor 18 is informed to the driving motor 12, and feeding operation is maintained until a new holding rail 14 is detected.

Interval Change Conveying Part 2

Figure 6:
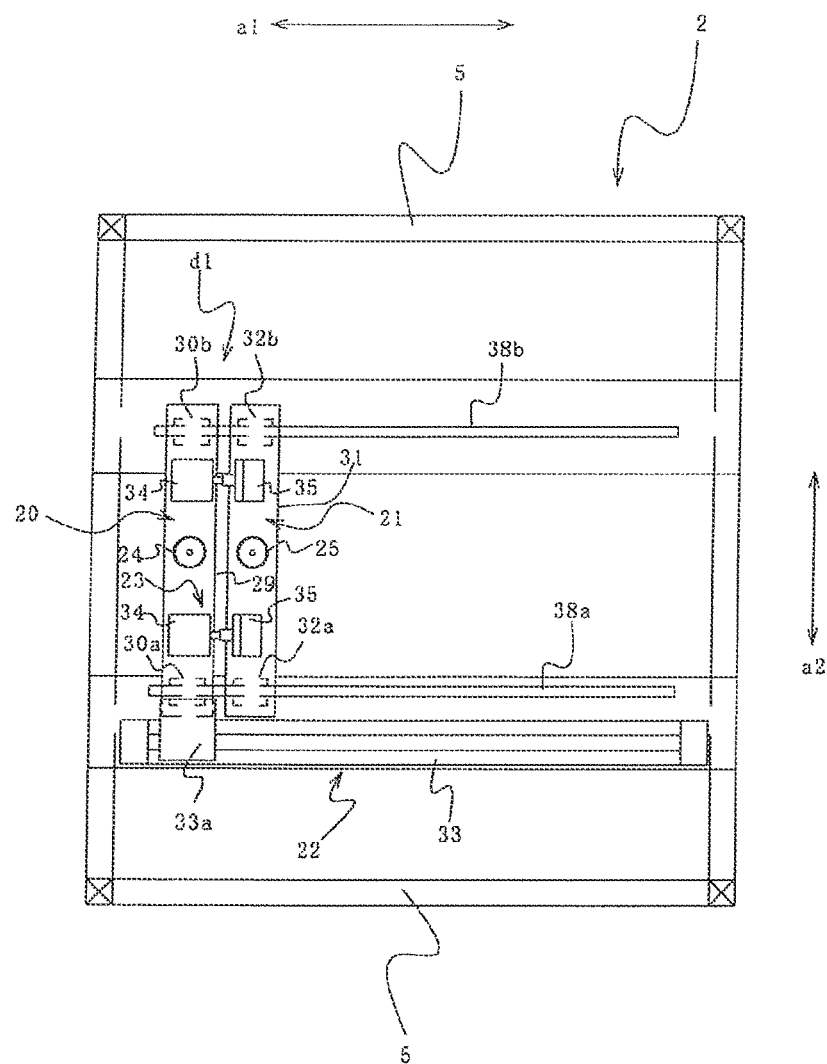
FIG. 6 is a plane view of an interval change conveying part of the supply apparatus.
Figure 7:
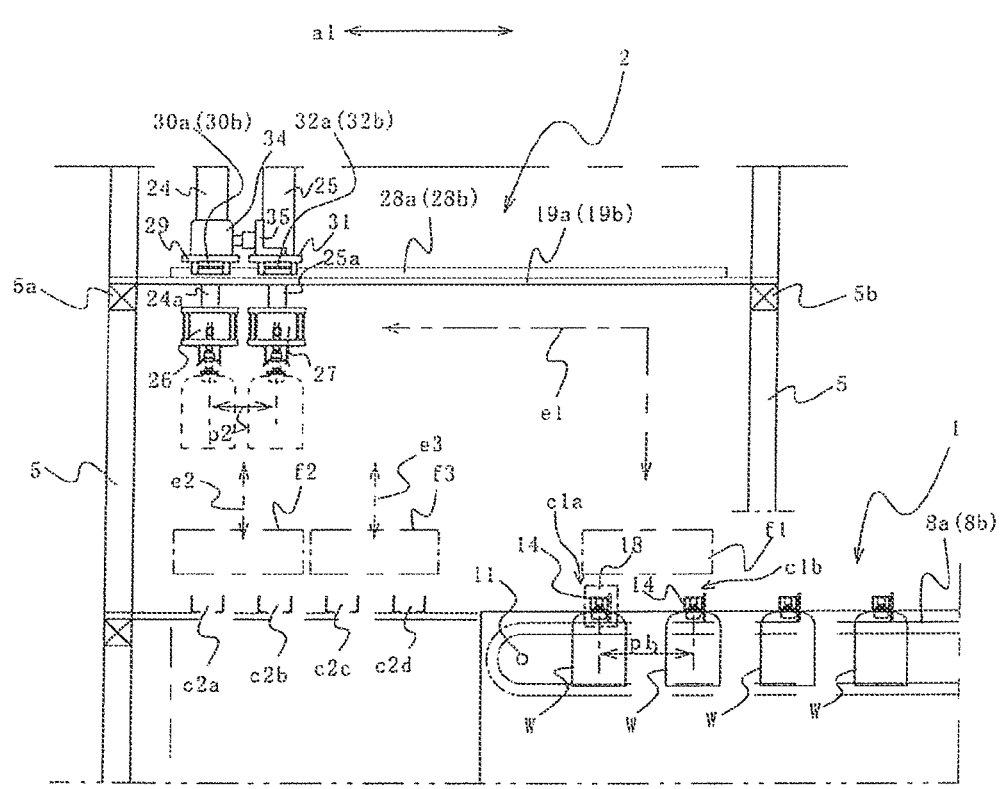
FIG. 7 is an explanatory view of the interval change conveying part seen from the side.

In FIG. 6, the interval change conveying part 2 changes the interval P1 between the holding rails 14 conveyed by the endless chains 8a, 8b to an interval between transfer rails 60. The interval change conveying part 2 is located in front of the intermittently conveying part 1, including a pair of front and back conveying members 20, 21, linear guide rails 38a, 38b horizontal to the front-back direction a1 and drive mechanism part 22. The front and back conveying members 20, 21 respectively include adsorbing members 26, 27 as shown in FIG. 7 and lift driving devices 24, 25 to convey the holding rails 14.

The front side conveying member 20 includes a base 29 long in the right-left direction a2, and sliding members 30a, 30b are fixed on right and left sides of a bottom face of the base 29. The sliding members 30a, 30b are respectively interfitted to the corresponding guide rails 38a, 38b so as to be slid. The lift driving device 24 is fixed on the top face of a center position in the lateral length of the base 29. The lift driving device 24 has an output shaft 24a extended to the lower part of the base 29. The adsorbing member 27 is fixed on the lower edge portion of an output shaft 24a.

The back side conveying member 21 conforms to the front side conveying member 20, including a base 31, sliding members 32a, 32b, being movable freely in the front-back direction a1 by being guided by the guide rails 38a, 38b. The lift driving device 25 is fixed on the top face of the lateral central portion of the base 31. The lift driving device 25 has an output shaft 25a extended downwardly from the bottom face of the base 31. The adsorbing member 27 is fixed on the lower end portion of an output shaft 25a.

The driving mechanism part 22 moves any of the conveying members (the reference number is 20 in this example) in the front-back direction a1. The driving mechanism part 22 includes a rodless cylinder device 33 fixed on the pedestal 5 along the front-back direction a1 so as to integrally connect an output member 33a of the rodless cylinder device 33 to the left end portion of the front side conveying member 20. The rodless cylinder device 33 moves the output member 33a in the front-back direction a1 by driving force of compressed air, and the output member 33a can be stopped at each of a plurality of predetermined optional positions on the front-back direction a1.

An interval change mechanism part 23 connects the pair of front and back conveying members 20, 21 to transmit indirectly a moving force of the drive mechanism part 22 to one of the conveying members (the reference number is 21 in this example) which is not directly connected to the drive mechanism part 22 through the conveying member 20. On the other hand, the interval change mechanism part 23 changes a relative interval between the conveying members 20, 21. Since the front side conveying members 20, 21 are commonly guided by the guide rails 38a, 38b, the interval can be changed while maintaining the parallel positional relationship therebetween. The interval change mechanism part 23 is laterally separated. An expansion cylinder device 34 having an air cylinder in the front-back direction a1 is fixed on the top face of the base 29 of the front side conveying member 20, and a connection piece 35 in an L-shaped side view is fixed on the top face of the base 31 of the back side conveying member 21, and the tip of the output shaft of the front-back directional expansion cylinder device 34 is fixed on the connection piece 35 at the back of it.

When the expansion cylinder device 34 is extended from the contracted state as shown in FIG. 6 by the driving force of the compressed air, a relative distance between the front and back conveying members 20, 21 is expanded. When the extended expansion cylinder device 34 is contracted, the front and back conveying members 20, 21 approach each other. The interval change mechanism part 23 may be a simplex without being separated laterally.

The following explains an operation that the conveying members 20, 21 pick up the holding rail 14. When the holding rail 14 is conveyed on the conveyance terminal cf, the sensor 18 detects and stops the holding rail 14. The expansion cylinder devices 34, 34 are operated to match the distances in the front-back direction a1 of the adsorbing members 26, 27 to the interval P1. The rodless cylinder device 33 and the lift driving devices 24, 25 are operated to move the adsorbing members 26, 27 at a picking-up position f1 via a route indicated by alternating long and short dash lines e1 in FIG. 7. In this case, the adsorbing members 26, 27 come to be lightly pressed on the top face of the corresponding holding rail 14.

After the adsorbing members 26, 27 reach the picking-up position f1, a vacuum pressure is given. Accordingly, the adsorbing members 26, 27 adsorb the holding rail 14 at the taking-out positions c1a, c1b just under them.

After this, the adsorbing members 26, 27 are moved reversely trace the route indicated by alternating long and short dash lines e1 to return to the initial position and further moved to a release position f2 via a route indicated by alternating long and short dash lines e2 by operations of the lift driving devices 24, 25, the expansion cylinder device 34 and the rodless cylinder device 33 while adsorbing the holding rail 14. The release position f2 is positioned at a point immediately above the front side two transfer positions c2a, c2b.

In the movement process from the picking-up position f1 to the release position f2, a front-back directional interval between the adsorbing members 26, 27 is matched to an interval between the transfer rails 60 by an operation of the expansion cylinder device 34.

When the adsorbing members 26, 27 reach the release position f2, two holding rails 14 respectively adsorbed by the adsorbing members 26, 27 are positioned on the corresponding transfer positions c2a, c2b. In this case, these two holding rails 14 are supported by a retention mechanism 3 detailed later so as to suppress the front-back and left-right movements. Thereafter, the vacuum pressure being given on the adsorbing members 26, 27 is excluded. The adsorbing members 26, 27 are saved at the initial position via the route indicated by the alternating long and short dash lines e2.

The intermittently conveying part 1 detects that the holding rail 14 is not existed on the conveyance terminal cf, and moves the next two holding rails 14 to the taking-out positions c1a, c1b just under the picking-up position f1.

According to the operation of the expansion cylinder device 34, the distance between the adsorbing members 26, 27 in the front-back direction a1 is matched to the size of the interval P1. Then, the adsorbing members 26,27 move to the picking-up position f1 and adsorb two holding rails 14 according to the operations of the rodless cylinder device 33 and the lift driving devices 24, 25 as in the previous case. Next time, the two holding rails 14 are conveyed to the release position f3 via routes indicated by alternating long and short dash lines e1, e3. The release position f3 is positioned on a rear side of the transfer positions c2a, c2b, where is immediately above two transfer positions c2c, c2d. Each interval among the transfer positions c2a, c2b, c2c, c2d is equal to the interval P2 between the transfer rails 60. The interval P2 is different from the interval P1. Thereafter, the adsorption-connection state between the adsorbing members 26, 27 and the holding rails 14 is released. Thereafter, the adsorbing members 26, 27 are saved via the route indicated by the alternating long and short dash lines e3.

Besides, it is described later which timing the movement from the picking-up position f1 to the release position f2 or from the picking-up position f1 to the release position f3 is carried out.

Bag Pushing Device 7

A bag pushing device 7 includes the retention mechanism 3 and a pushing mechanism part 4, wherein the retention mechanism 3 retains the holding rails 14 at the interval P2 and the pushing mechanism part 4 pushes the spout-equipped bags in the holding rail 14 on the parallel transfer rail 60 to supply them into a packing machine 101.

Retention Mechanism 3

The following explains a retention mechanism 3.

Figure 8:
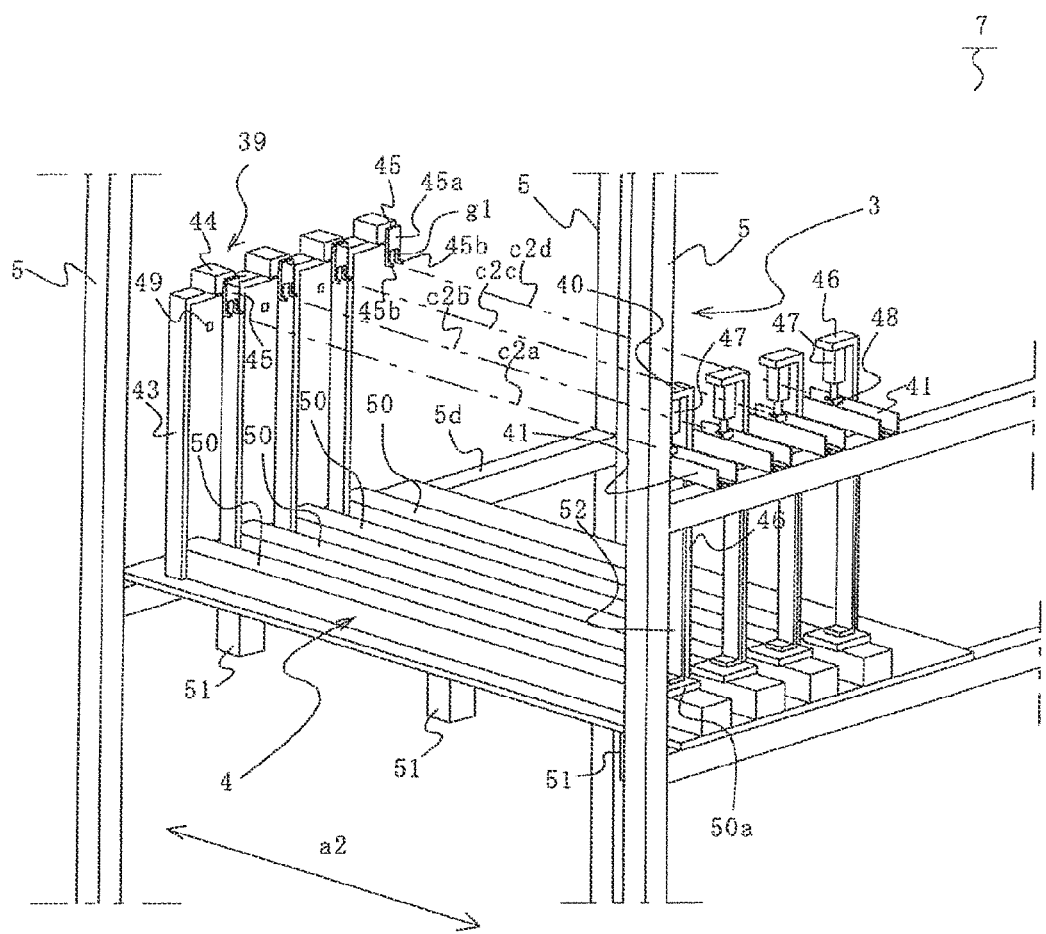
FIG. 8 is a perspective view of a retention mechanism and a pushing mechanism part.
Figure 9:
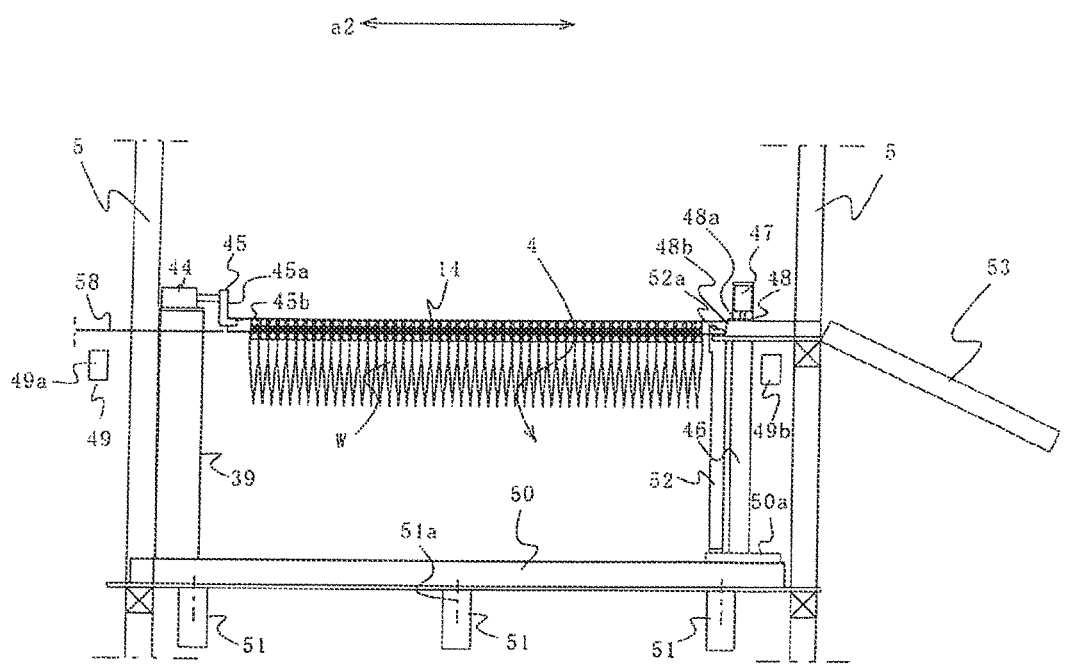
FIG. 9 is a view showing an operation state of the retention mechanism and the pushing mechanism part.

In FIG. 8 and FIG. 9, the retention mechanism 3 is provided with left and right restricting parts 39, 40 and left side support face portions 41, which are respectively provided corresponding to four transfer positions c2a, c2b, c2c, c2d set on the downstream of the taking-out positions c1a, c1b viewing from the conveying direction of the intermittently conveying part 1. The holding rails 14 are held in the left-right direction a2 and opposed to the transfer rails 60. The release position f2 corresponds to the transfer positions c2a, c2b, and the release position f3 corresponds to the transfer positions c2c, c2d.

The position restricting part 39 supports the right end of the holding rail 14 which is conveyed on one position among the four transfer positions c2a, c2b, c2c, c2d. The position restricting part 39 is fitted on a position where a support rod 43 raised from a horizontal base plate 42 of a pedestal 5 is horizontally bent to 90°, including an expansion cylinder device 44 extending in the left-right direction a2 and a hook-like claw member 45 fixed on the front portion of the output shaft of the expansion cylinder device 44. The claw member 45 has a vertical face portion 45a and a pair of claw portions 45b, 45b protruding to the left direction from the front and back portions of the lower part. Between the claw portions 45b, 45b, is formed a gap g1 for passing the cylindrical portion b1 of the spout-equipped bag W without getting caught.

The position restricting part 40 holds the left end of the holding rail 14 which is conveyed on one position among the four transfer positions c2a, c2b, c2c, c2d. The position restricting part 40 is fitted on a position where a support rod member 46 raised from the horizontal base plate 42 is horizontally bent to 90°, including an expansion cylinder device 47 extending downward and a hook-like claw member 48 fixed on the front portion of the output shaft of the expansion cylinder device 47. The claw member 48 has a horizontal face portion 48a for connecting the output shaft of the expansion cylinder device 47 and a vertical face portion 48b being protruded downwardly from the right edge of the horizontal face portion 48a along the front-back direction a1.

The bottom face of the left end portion of the holding rail 14 conveyed on one position among the four transfer positions c2a, c2b, c2c, c2d is mounted on the support face portion 41. The support face portion 41 is formed in a groove whose top face is open, and fixed horizontally to the pedestal 5. The support face portion 41 has a size so that the holding rail 14 can enter from above without getting caught and so that the length in the left-right direction a2 can reach the right side than the position of the claw portion 48.

Figure 10:
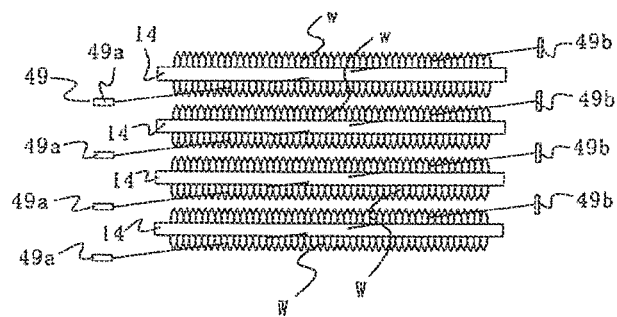
FIG. 10 is a view of the holding rails held on the retention mechanism and the spout-equipped bags held by the holding rails seen from above.
Figure 11:
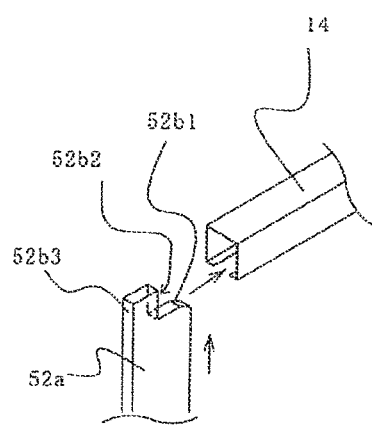
FIG. 11 is an explanatory view of an action, expanding a part of the retention mechanism.

In FIG. 10, four sensors 49 are provided near the transfer positions c2a, c2b, c2c, c2d to detect the spout-equipped bags W held by the holding rails 14 positioned on the transfer positions c2a, c2b, c2c, c2d, respectively. Each sensor 49 includes a right projector 49a and a photoreceptor 49b facing to the left-right direction a2 to detect the spout-equipped bag W therebetween.

An operation of the retention mechanism 3 is explained below.

When the intermittently change conveying part 2 conveys two holding rails 14 from the picking-up position f1 to the release position f2, the bottom faces of the left ends of the holding rails 14 are mounted on the support face portions 41 on the transfer positions c2a, c2b. On the other hand, the claw member 48 is descended by the expansion cylinder device 47 and the left end of the holding rail 14 is confronted to the right face portion 52a of the claw member 48.

On the right sides of the holding rails 14, the expansion cylinder device 44 of the position restricting part 39 is operated so as to extend, the claw member 45 is moved to the right side, and the claw portions 45b, 45b are inserted into the inner space of these holding rails 14. The claw member 45 supports the bottom face of the top wall portion of the right end of each of the holding rails 14 so as not to interfere in the cylindrical members b1 of the spout-equipped bags W held by the holding rail 14. In this state, the vacuum pressure is removed from the adsorbing members 26, 27, and the spout-equipped bags W are transferred from the conveying parts 20, 21 to the retention mechanism 3. Thereafter, the adsorbing members 27, 28 retract upwards.

When the adsorption-connection state of the adsorbing members 27, 28 is released, the expansion cylinder device 44 is further extended to the right side and the claw member 45 presses the holding rail 14 to the left direction. According to this, the holding rail 14 is pressed between the claw member 45 and the claw member 48, so that the position of the holding rail 14 becomes corrected.

Next, when the intermittently change conveying part 2 conveys the holding rail 14 of the picking-up position f1 to the release position f3, the expansion cylinder device 47 and the expansion cylinder device 44 are similarly operated to put in a state where the holding rail 14 is positioned.

The sensors 49 around the transfer positions c2a, c2b, c2c, c2d detect the presence of the spout-equipped bag W all the time. When these sensors 49 detect no presences of the spout-equipped bag W on at least one of the transfer positions c2a, c2b, c2c, c2d, the intermittently change conveying part 2 operates so as to convey the holding rail 14 of the picking-up position f1 to the detected transfer position c2a, c2b, c2c or c2d.

Each of the holding rails 14 holds as many spout-equipped bags. In the conveyance of the holding rails 14 to the transfer positions c2a, c2b, c2c, c2d, unless a timing lag does not occur in conveying the spout-equipped bags W corresponding to the transfer positions c2a, c2b, c2c, c2d to a packing machine 101, the spout-equipped bags W are not present on the holding rails 14 of the front side transfer positions c2a, c2b at the same time, and besides, the spout-equipped bags W are not present on the holding rails 14 of the back side transfer positions c2c, c2d at the same time. Accordingly, two holding rails 14 are conveyed to the front side transfer positions c2a, c2b and the back side transfer positions c2c, c2d alternatively.

Pushing Mechanism Part 4

Figure 12:
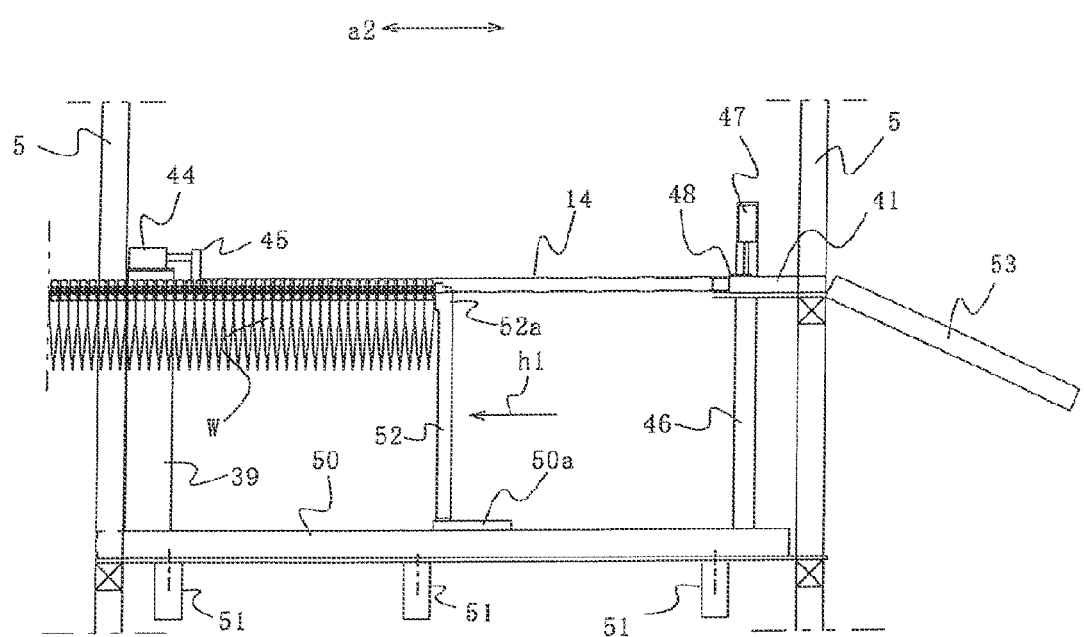
FIG. 12 is a view of a state where the spout-equipped bags are pushed and moved to the packing machine.

Next, a pushing mechanism part 4 will be explained. The pushing mechanism part 4 includes a rodless cylinder device 50 reciprocating in the left-right direction a2, a plurality of lift mechanisms 51 and pushing members 52 extended upwardly from output members 50a of the rodless cylinder devices 50 as shown in FIG. 12. The output member 50a of the rodless cylinder device 50 is displaced by the driving force of the compressed air in the left-right direction a2. Besides, four pushing mechanism parts 4 are provided according to the transfer positions c2a, c2b, c2c, c2d. (See FIG. 8.) Each of the lift mechanisms 51 move upward and downward the rodless cylinder device 50 by the driving force. The pushing member 52 is formed out of a long and narrow plate member.

An operation of the above-mentioned pushing mechanism part 4 will be explained.

When four holding rails 14 are respectively positioned on the transfer positions c2a, c2b, c2c, c2d through the retention mechanism 3, a bag conveying face 52b3 of the pushing member 52 is turned on to enter a standby state on the position opposing to the cylinder portion b1 of the spout-equipped bag W in the holding rails 14 (which is in a state of FIG. 9). In this case, the lift mechanism 51 is brought to the contracted state. Besides, the upper portion of each of the pushing members 52 standing-by on this position is capable of entering the inside through the slit 14a of the corresponding holding rail 14 without interfering on the holding rail 14 during the support and the positioning process of the retention mechanism 3.

Figure 14:
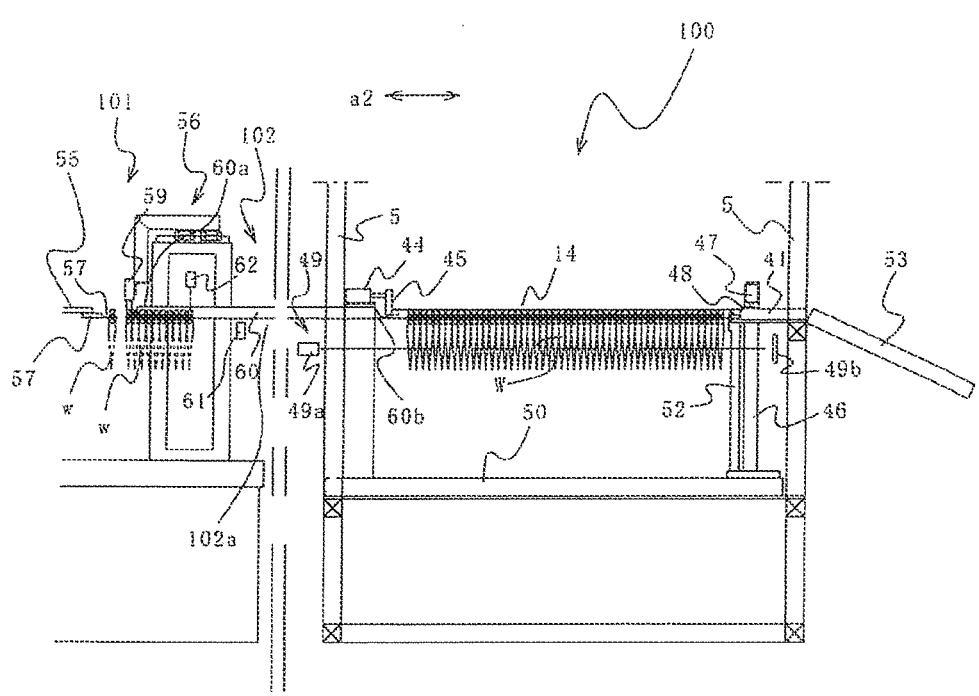
FIG. 14 is a view of a condition where the spout-equipped bags are supplied from the supply apparatus to the packing machine.

Under this condition, the corresponding rodless cylinder device 50 moves the output member 50a to the left side as indicated by an arrow h1 as shown in FIG. 12. Accordingly a bag conveying face 52b3 of the pushing member 52 pushes and moves the rightmost spout portion W2 of the spout-equipped bag W held by the corresponding holding rail 14 to the left side through the slit 14a. According to this pushing displacement, the whole of the corresponding spout-equipped bag group is moved to the left side as being guided by the holding rail 14. When this spout-equipped bag W group passes the positions of the pair of front and back claw portions 45b, 45b of the corresponding claw member 45, the spout portion W2 of the passing spout-equipped bag W passes the inside of the gap g1 between the pair of claw portions s5b, s5b (see FIG. 8). Therefore, the spout-equipped bag W group never interferes to the hook-shaped claw member 45. When thus moved to the left side pushing member 52 reaches the left side than the claw member 45, the movement to the left side is stopped. The spout-equipped bag W group pushed-out from the holding rail 14 by the left movement of the pushing member 52 moves to a bag transfer part 102 as described later (see FIG. 14) which is provided to the left sides of the transfer positions c2a, c2b, c2c, c2d.

After the left movement of the pushing member 52 is stopped, the lift mechanism 51 supporting the rodless cylinder device 50 is operated so as to extend. According to this extension, the pushing member 52 reached the left side than the claw member 45 moves upwards, a rail pushing face 52b2 of the top portion 52a (the opposite side of the bag conveying face 52b3) is positioned to the left end face of the holding rail 14, which is the height so as to be interfered. Continuously, as for the rodless cylinder device 50, when the pushing member 52 is moved to the left-right direction a2, a support face 52b1 of the pushing member 52 is positioned under the upper wall part of the left side of the corresponding holding rail 14. Thereafter, the output shaft of the expansion cylinder device 44 corresponding to this holding rail 14 moves to the left side, two claw portions 45b, 45b of the claw member 45 separate from the holding rail 14. According to this, this holding rail 14 has the left end supported by the support face 52b1.

On the other hand, if the expansion cylinder device 47 is contracted, the other claw member 48 supported on the output shaft of the expansion cylinder device 47 is moved to a position higher than the holding rail 14.

Figure 13:
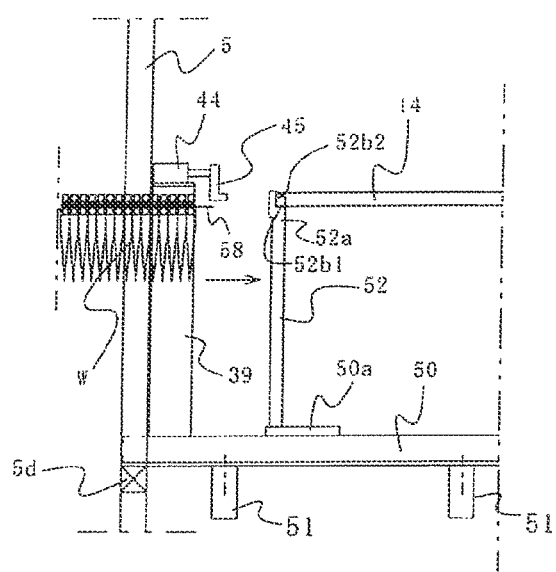
FIG. 13 is an explanatory view of a state where the holding rail is pushed and moved by the pushing mechanism.

Thereafter, the rodless cylinder device 50 corresponding to the pushing member 52 moves the pushing member 52 to the right side to return the standby position. According to this, the pushing member 52 goes into a state where the rail pushing face 52b2 is contact with the left end of the holding rail 14 just besides the pushing member 52 as shown in FIG. 13 to push and move the holding rail 14 in the right direction. Thus moved holding rail 14 is guided to the support face portion 41 and pushed out right outside of the support face portion 41. Thus pushed-out holding rail 14 drops the spout-equipped bag W through an inclined guide path 53 provided so as to extend the right side support face portion 41. The treatments for pushing and moving the spout-equipped bag W group and the holding rails 14 are similarly carried out at the transfer positions c2a, c2b, c2c, c2d, respectively.

Packing Machine 101 and Bag Transfer Part 12

Next, the packing machine 101 and a bag transfer part 102 which are installed in relation to the supply apparatus 100 will be explained.

In FIG. 1, the packing machine 101 includes a table 55 intermittently rotated around a rotational axis 54 and a bag supply part 56 provided adjacently to the table 55.

The table 55 is provided with bag receiving parts 55a having four bag holding members 57 for receiving and holding a spout-equipped bag W on the outside at fixed intervals P2 in the circumferential direction. When each bag receiving part 55a is integrally rotated with the table 55 and moved to the bag receiving position opposed to the bag supply part 56, the four bag holding members 57 are arrayed in one straight line at the interval P2 in the front-back direction a1.

The bag supply part 56 holds four spout-equipped bags W arrayed at the interval P2 in the front-back direction a1 by a holding conveying means 59, respectively, and these four spout-equipped bags W are held by four bag holding members 57 of one bag receiving part 55a at the same time.

Until one bag receiving part 55a rotates around the rotational axis 54 integrally with the table 55 from a point wherein the bag receiving part 55a is opposed to the bag supply part 56, the four spout-equipped bags W held the four bag holding members 57 of each bag receiving part 55a are moved so as to pass through a plurality of processing positions. During this movement, for example, these four spout-equipped bags W are processed so that fillers are injected at the same time at the first processing position and caps are fastened to opening portions of the spout part W2 at the same time at the next processing position, and then, so as to be separated from each bag holding member 57 at the same time at the next processing position.

The bag transfer part 102 includes four transfer rails 60 arranged in a parallel at the interval P2 in the front-back direction a1 and a vibratory equipment 61 for vibrating each of the transfer rails 60. Each of the transfer rails 60 has a shape similar to the holding rail 14, and the cylindrical portion b1 of the spout-equipped bag W is slid thereon. The transfer rail 60 guides the spout-equipped bags W from the holding rail 14 held by the transfer positions c2a, c2b, c2c, c2d in one straight line to the bag supply part 56. The right side end 60b of the transfer rail 60 is positioned on nearby the right of the claw member 45 on the pushing mechanism part 4 side. The position of the right side end 60b of the transfer rail 60 is set up to be higher than the left side end 60a, thereby improving conveying posture of the spout-equipped bags W by slight vibration of the transfer rail 60 depending on the operation of the vibration equipment 61.

When the pushing member 52 pushes out the spout-equipped bag W group held on the holding rail 14 on the transfer positions c2a, c2b, c2c, c2d, all of them are transferred from the holding rail 14 to the transfer rail 60, respectively. Thereafter, thus transferred spout-equipped bag W group is conveyed toward the bag supply part 56 on the transfer rail 60 by the action of the gravity due to the inclination and the slight vibration due to the vibration equipment 61. The spout-equipped bags W on the transfer rail 60 are gradually displaced the bag supply part 56 side by being supplied to the bag holding member 57 by the holding conveying means 59 in order.

A sensor 62, which detects that a remaining amount of the spout-equipped bag W group on the transfer rail 60 becomes the previously determined small amount by recognizing the absence of spout-equipped bags W of the previously determined area, is provided near the transfer rail 60. When the sensor 61 is operated so as to detect, the pushing member 52 pushes out the spout-equipped bags W held on the holding rail 14 positioned on the corresponding transfer positions c2a, c2b, c2c, c2d.

In the above-mentioned explanation, a case where any troubles do not occur in supplying the spout-equipped bags W in the packing machine 101 has been explained. However, it is not said that the supply of the spout-equipped bags W on the part of the transfer rails 60 is not temporarily stopped automatically or manually by any troubles occurred in filling/packing processing on the packing machine 101.

In this case, it is capable of dealing with voluntarily by automatically changing the operation of the rodless cylinder device 33 of the interval change conveying part 2 and the operations of the lift driving devices 24, 25.

In these treatments, a case where one holding rail 14 should be conveyed from the picking-up position f1 to the font side transfer positions c2a, c2b or the back side transfer positions c2c, c2d occurs. In this case, ordinarily, it is better to deal with so as to convey one holding rail 14 positioned in front of the picking-up position f1 through the interval change conveying part 2. Two holding rails 14 are automatically positioned on the picking-up position f1 by the mentioned operation of the intermittently conveying part 1, thereby being capable of continuing the automatic and continuous conveyance of the holding rails 14 by the supplying device 100 with no difficulty.

According to the supply apparatus 100 of this example, the pair of front and back conveying members 20, 21 are connected to each other by the interval change mechanism 23, being capable of changing in parallel the front-and-back directional interval while two holding rails 14 are moved from the picking-up position f1 to the release position f2 or f3 at the same time.

According to the supply apparatus 100 of this example, because the interval between the pair of front and back conveying members 20, 21 can be changed, there is no need to match the interval P1 between the endless chains 8a, 8b and the interval P2 between the transfer rails 60. Therefore, the endless chains 8a, 8b are based on an inch standard to be normally used for chains, thereby being capable of solving an occurrence of interval difference from a device based on an MKS standard.

Further, the operator can set up to an interval easy to mount the holding rails 14 on the interval conveying part 1, for example, by widening the interval P1 than the interval P2 because it is not necessary to match the interval P1 and the interval P2.

According to the supply apparatus 100 of this example, the holding rail 17 that has been emptied is exhausted opposite the transfer rail 60. Since this place is the opposite side of the packing machine 101, it is possible to increase the interval between the place where the holding rail is retained and the packing machine 101. Besides, since the operation for exhausting relies on the reciprocating motion of the pushing member 52, there is an effect of being able to realize using a simple mechanism.

According to the supply apparatus 100 of this example, the spout-equipped bags W can be supplied in parallel from a plurality of holding rails 14 to the packing machine 101 by the pair of front and back conveying members 20, 21. For example, in using the transfer positions c2a, c2b only, it is possible to deal with a packing machine for processing two spout-equipped bags W at the same time, which is what is called a double machine having two sets of transfer rails 60. In expecting a multiplex packing machine performing in parallel four steps, it is possible to correspond if all of the transfer positions are used. In case the transfer rail 60 corresponds to one packing machine for processing spout-equipped bags W, which is a so-called single machine, it may use one transfer position.

Even when the multiplex packing machine is used, there is an advantage in which the operator can easily work because a setting place of the holding rail 14 is one place on the intermittently conveying part 1.

In this example, although the intermittently conveying part 1 is to intermittently convey the holding rails 14 by the endless chains 8a, 8b, the projection pieces 13a, 13b and the support plates 15a, 15b, it may be a belt conveyor having the projection pieces 13a, 13b.

Further, in this example, although the interval between two holding rails 14 is changed according to the pair of front and back conveying members 20, 21, it is also possible to change in parallel the intervals among a plurality of holding rails 14 by increasing the number of conveying members 20, 21.

In this example, although the pushing member 52 is made to move up and down by holding up the rodless cylinder device 50 through the lift mechanism 51, it is also possible to make it move up and down by providing the lift mechanism 51 between the output shaft 50a and the pushing member 52 in which the rodless cylinder device 50 is fixed on the pedestal 5.

DESCRIPTION OF THE REFERENCE NUMERAL 1 intermittently conveying part
2 interval change conveying part
3 retention mechanism
4 pushing mechanism part
7 bag pushing device
8a, 8b endless chain
14 holding rail
20, 21 conveying member
23 interval change mechanism part
26, 27 adsorbing member
38a, 38b guide rail
51 lift mechanism
52 pushing member
52b1 support face
52b2 rail pushing face
52b3 bag conveying face
60 transfer rail
100 supply apparatus
101 packing machine
W spout-equipped bag

The invention claimed is:

1. A supply apparatus for supplying spout-equipped bags located at a transfer position to a packing machine performing a predetermined packing through a transfer rail, said supply apparatus comprising:

a holding rail having an engaging part for engaging a flange portion of a spout-equipped bag, the holding rail being configured to hold a plurality of spout-equipped bags aligned in a row when the plurality of spout-equipped bags are hung from the holding rail;

a rail supply part for conveying the holding rail to the transfer position in order to transfer the plurality of spout-equipped bags on the transfer rail:

a retention mechanism for retaining the holding rail conveyed by the rail supply part at the transfer position in a state opposing the transfer rail;

a pushing member for reciprocating in a longitudinal direction of the holding rail, the pushing member having a bag conveying face for contacting the spout-equipped bag hung from the holding rail and for pushing the spout-equipped bag toward the transfer rail, and the pushing member further having a rail pushing face for contacting the holding rail and for exhausting the holding rail from the transfer position opposite the transfer rail;

a lift mechanism for moving the pushing member downward when the pushing member moves forward, and for moving the pushing member upward to a height where the rail pushing face will contact the holding rail when the pushing member moves backward.

2. The supply apparatus according to claim 1, wherein the retention mechanism is provided with a claw member for correcting positions of the holding rail transferred to the transfer position.

3. The supply apparatus according to claim 1, wherein the pushing member is provided with a support face providing support when the pushing member is moved upward by the lift mechanism.

4. The supply apparatus according to claim 2, wherein the pushing member is provided with a support face providing support when the pushing member is moved upward by the lift mechanism.

5. The supply apparatus according to claim 1, wherein the rail supply part is provided with an intermittently conveying mechanism part for conveying the holding rail to a predetermined removal position, and a rail conveying mechanism part for removing the holding rail positioned at the removal position and for transferring the holding rail to the transfer position.

6. The supply apparatus for spout-equipped bags according to claim 2, wherein the rail supply part is provided with an intermittently conveying mechanism part for conveying the holding rail to a predetermined removal position, and a rail conveying mechanism part for removing the holding rail positioned at the removal position and for transferring the holding rail to the transfer position.

7. The supply apparatus for spout-equipped bags according to claim 3, wherein the rail supply part is provided with an intermittently conveying mechanism part for conveying the holding rail to a predetermined removal position, and a rail conveying mechanism part for removing the holding rail positioned at the removal position and for transferring the holding rail to the transfer position.

* * * * *